United States Patent
Darcy, III et al.

(10) Patent No.: US 7,780,805 B2
(45) Date of Patent: *Aug. 24, 2010

(54) CONCURRENT WELDING AND SEVERING BELT FORMING PROCESS

(75) Inventors: John J. Darcy, III, Webster, NY (US); Michael S. Roetker, Webster, NY (US); David W. Martin, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 860 days.

This patent is subject to a terminal disclaimer.

(21) Appl. No.: 11/273,211

(22) Filed: Nov. 14, 2005

(65) Prior Publication Data

US 2007/0107829 A1   May 17, 2007

(51) Int. Cl.
*B32B 37/00* (2006.01)
(52) U.S. Cl. .................. 156/73.3; 156/73.1; 156/73.4; 156/157; 156/159; 156/229; 156/285
(58) Field of Classification Search ........... 156/73.1, 156/73.3, 73.4, 157, 159, 304.1, 304.6, 580.1, 156/580.2, 229, 285; 100/29, 32, 33 PB
See application file for complete search history.

(56) References Cited

U.S. PATENT DOCUMENTS

| | | | |
|---|---|---|---|
| 3,419,447 A | 12/1968 | Hewitt | |
| 3,799,859 A | 3/1974 | Wallin | |
| 3,939,033 A | 2/1976 | Grgach et al. | |
| 4,532,166 A | 7/1985 | Thomsen | |
| 4,878,985 A | 11/1989 | Thomsen | |
| 4,959,109 A | 9/1990 | Swain | |
| 5,085,719 A | 2/1992 | Eck | |
| 5,207,854 A * | 5/1993 | Becking | 156/350 |
| 5,693,372 A | 12/1997 | Mistrater | |
| 6,082,254 A * | 7/2000 | De Vlaam | 100/2 |
| 6,217,686 B1 * | 4/2001 | Kelley et al. | 156/73.1 |
| 6,740,182 B2 * | 5/2004 | Yu | 156/73.4 |
| 6,815,131 B2 | 11/2004 | Darcy, III | |
| 6,848,978 B2 | 2/2005 | Mastro | |
| 7,262,389 B2 * | 8/2007 | Irwin et al. | 219/243 |

* cited by examiner

*Primary Examiner*—James Sells
(74) *Attorney, Agent, or Firm*—Alix, Yale & Ristas, LLP

(57) ABSTRACT

Belt material is wrapped around a small diameter mandrel. Instead of cutting the belt to length, the material is then continued to be wrapped around the mandrel, forming a belt material overlap, and held under tension. An ultrasonic welding horn is then traversed across the width of the belt overlap. As this horn is traversed across the overlapped joint, the horn not only joins the belt material wrapped around the mandrel but, as the trailing edge is held under tension, the horn also separates or severs the trailing edge of the material from the welded seam.

29 Claims, 5 Drawing Sheets

CONCURRENT WELDING AND SEVERING
BELT FORMING PROCESS

INCORPORATION BY REFERENCE OF OTHER
U.S. PATENTS

The disclosures of the following ten (10) U.S. Patents hereby are incorporated by reference, verbatim, and with the same effect as though the same disclosures were fully and completely set forth herein:

U.S. Pat. No. 3,419,447, "Method and apparatus for bonding together two thermoplastic sheets by ultrasonic energy", issued 31 Dec. 1968 to Eugene E. Hewitt ("Hewitt");

U.S. Pat. No. 3,799,859, "Electroforming system", issued 26 Mar. 1974 to Edwin M. Wallin ("Wallin"), assigned to Xerox Corporation;

U.S. Pat. No. 3,939,033, "Ultrasonic welding and cutting apparatus", issued 17 Feb. 1976 to Frank J. Grgach et al. ("Grgach");

U.S. Pat. No. 4,532,166, "Welding of web materials", issued 30 Jul. 1985 to Karl V. Thomsen et al. ("Thomsen"), assigned to Xerox Corporation;

U.S. Pat. No. 4,878,985, "Apparatus for preparing belts", issued 7 Nov. 1989 to Karl V. Thomsen et al. ("Thomsen"), assigned to Xerox Corporation;

U.S. Pat. No. 4,959,109, "Apparatus and process for preparing belts", issued 25 Sep. 1990 to Eugene A. Swain et al. ("Swain"), assigned to Xerox Corporation;

U.S. Pat. No. 5,085,719, "Variable rate welding of thermoplastic belts", issued 4 Feb. 1992 to David A. Eck ("Eck"), assigned to Xerox Corporation;

U.S. Pat. No. 5,693,372, "Immersion coating process", issued 2 Dec. 1997 to Alan B. Mistrater et al. ("Mistrater"), assigned to Xerox Corporation;

U.S. Pat. No. 6,815,131 B2, "Method for making an imaging belt", issued 9 Nov. 2004 to John Joseph Darcy, IIII ("Darcy, III"), the same individual as one of the present applicants, the patent being assigned to Xerox Corporation; and U.S. Pat. No. 6,848,978 B2, "Method of finishing a belt seam using an abrasive finishing machine, a method of finishing a belt seam using an abrasive finishing machine having a plurality of finishing heads, and a method of finishing a belt seam using an abrasive finishing machine having first, second, third and fourth finishing heads", issued 1 Feb. 2005 to Paul F. Mastro et al. ("Mastro"), assigned to Xerox Corporation.

BACKGROUND OF THE INVENTION

Ultrasonic bonding or welding is known. For example, in the aforementioned U.S. Pat. No. 3,419,447 to Hewitt there is described a method and apparatus for bonding thermoplastic sheets to one another wherein adjacent marginal regions of the sheets are overlapped to form an area of double thickness and this overlapping area is then passed between a pair of ultrasonically vibrating tools. The tools compress and heat an intermediate portion of the overlapping area and are constructed and arranged to concurrently (1) transpose the sheets into a common plane, (2) bond the sheets to one another in the intermediate portion, and (3) cut off a pair of unbonded edge portions of the marginal regions at the opposite sides of the bonded portions thereof and at the opposite faces of the sheets, respectively.

Also, in the aforementioned U.S. Pat. No. 3,939,033 to Grgach, there is described an ultrasonic welding and cutting apparatus using an ultrasonically vibrating horn and an anvil means.

Also, in the aforementioned U.S. Pat. No. 4,532,166 to Thomsen there is depicted in FIGS. 1-2 and described in col. 2, lines 22-59 an ultrasonic welding apparatus including an ultrasonic horn 12 vibrating along a vertical axis 14. The edge 16 of a thermoplastic web 18 is supported by the upper surface of an included anvil 10 and the edge 20 of the web 22 is positioned so that the edge 20 of the web 22 overlaps the edge 16 of the web 18. Edge 20 of web 22 contains plural apertures 24. The high vibration frequency of the horn 12 causes the temperature of at least the contiguous overlapping surfaces of the thermoplastic web 18 and web 22 to increase until at least the thermoplastic material in web 18 flows and fill apertures 24. A sectional view of the resulting bonded joint or seam is shown in FIG. 3.

Also, in the aforementioned U.S. Pat. No. 4,878,985 to Thomsen there is described a process and apparatus for fabricating belts utilizing ultrasonic welding. For example, an ultrasonic belt welding station 12 comprising an ultrasonic horn and transducer assembly 300 is described in connection with FIGS. 1, 11, 12 and 13; especially see the written description from col. 14, line 43 to col. 17, line 5.

Also, in the aforementioned U.S. Pat. No. 6,815,131 B2 to Darcy, III, there is described a process of forming a flexible belt utilizing an ultrasonic welding system 70. The ultrasonic welding system 70 is depicted in FIG. 4. As depicted in FIGS. 4-7 and described in the written description at col. 4, lines 18-40, there is provided a flexible belt member 105 having a first end 110 and a second end 120. The first end 110 overlaps the second end 120 and forms an overlap region. In turn, the first and second ends 110 and 120 are ultrasonically welded at one or more locations along the overlap region, thus forming a finished belt. One example of a finished belt 100 is shown in FIG. 8.

Using mandrels in forming endless belts is known. In the aforementioned U.S. Pat. No. 3,799,859 to Wallin, for example, there is described a method and apparatus for forming a relatively thin, flexible endless belt on a support mandrel. After the endless belt is formed, the belt is removed from the mandrel.

Also, in the aforementioned U.S. Pat. No. 5,693,372 to Mistrater, there is described a process for dip coating a drum substrate 23. As depicted in FIG. 2 and described in the written description from col. 6, line 40 to col. 7, line 5, the drum substrate 23 is suspended from a mandrel 25 which grips the interior surface of the drum substrate 23.

Using vacuum apertures to secure or hold a belt material during ultrasonic welding is known. In the aforementioned U.S. Pat. No. 4,959,109 to Swain, for example, col. 3, lines 37-60 describe using a vacuum slot 29 to hold a free end of web 6 at a wrapping station 2. The vacuum slot 29 may alternately comprise one or more rows of holes of any suitable shape.

Further, Swain's written description from col. 4, line 59 to col. 5, line 7 describes a vacuum pick up arm 50 including a vacuum chamber 56 coupled to vacuum slots 59, 60 and 61. If desired, additional rows of slots or other suitably shaped apertures may be substituted for vacuum slots 59, 60 and 61.

Further, Swain discloses parallel rows of ports 90, 91 and 92 positioned axially along the outer periphery of mandrel 80. These ports 90, 91 and 92 are connected through airways 93, 94 and 96 that extend from the ports 90, 91 and 92 through shaft 82 to circumferential channels 98, 100 and 102 which, in turn, are connected through corresponding air lines through a journal box 84 to a cluster of electrically activateable valves and switches 105. Positive pressure, a vacuum or ambient air pressure may be supplied to the journal box 84 from any suitable conventional source, Swain, col. 6, lines 14-46.

Although Swain's mandrel 80 is illustrated as a cylinder having a circular cross section, the cross section may be of any other suitable shape. Also, the location of the web seam 138 on the mandrel is preferably positioned parallel to the axis of the mandrel along an imaginary line or band on the outer periphery of the cylinder defined by the greatest radius of the cylinder, Swain, col. 6, lines 55-64.

Further, Swain's web 6 is placed over parallel rows of ports 90 and a vacuum is supplied to the parallel rows of ports 90 to secure the web 6 to the mandrel 80, Swain, col. 7, lines 65-68.

As Swain's mandrel 80 nears the end of its rotation cycle, a vacuum is supplied to parallel rows of ports 92 which anchors the adjacent region of web 6 to mandrel 80 to ensure that web 6 remains tightly wrapped under tension on the mandrel 80 even after a subsequent web cutting operation, Swain, col. 8, lines 17-22.

When Swain's mandrel 80 completes its rotation cycle of 360 degrees, a vacuum is supplied to secure web 6 to support platform 28; pneumatic cylinder 78 is activated to extend disk knife 79 through web 6 and against edge 26; and electric motor 72 is started to rotate lead screw 71 to reciprocate carriage 77 and disk knife 79 across the width of web 6 thereby severing web 6, col. 8, lines 22-29. Upon completion of shearing, a vacuum is supplied to the ports 91 to suck and tack the freshly severed trailing end of web 6 against mandrel 80, the freshly severed trailing end of the web 6 overlapping the leading end to form a seam 138, Swain, col. 8, lines 32-38.

Further, Swain's written description from col. 9, line 38 to col. 10, line 1 describes an ultrasonic welding station 3 comprising an ultrasonic horn 136. The seam 138 of overlapping ends of thermoplastic web 6 is supported by mandrel 80 and held in place below the path of ultrasonic horn 136 by suction from parallel rows of ports 90, 91 and 92, col. 9, lines 38-45. The ultrasonic horn 136 traverses the seam 138, col. 9, lines 65-68; col. 10, line 1, thereby welding the seam 138, from col. 11, line 13 to col. 12, line 2. See also Swain, col. 22, lines 3-32.

Also, the aforementioned U.S. Pat. No. 5,085,719 to Eck describes at col. 5, lines 15-22 a web lap joint 24 formed by the overlapping segment ends of thermoplastic web 12 that is supported by the upper surface of anvil 14 and held in place below the path of ultrasonic horn and transducer assembly 30 by suction from parallel rows of grooves 33, 34, 36 and 38 in the upper surface of anvil 14, the grooves leading to vacuum plenums within the interior of the anvil 14.

Further to Eck, col. 6, lines 1-16 describe applying vacuum to grooves 33, 34, 36 and 38 to hold the overlapping opposite edges 20 and 22 of web 12 in place during ultrasonic welding. As described, the length of grooves 33, 34, 36 and 38 is normally slightly shorter than the width of web 12. Any suitable vacuum aperture, such as grooves or holes, may be utilized. See also the "example" described from col. 13, line 30 to col. 14, line 30.

A new polymeric material named "Kapton" has been developed jointly by DuPont and Xerox Corporation for intermediate transfer belts. Note that the trademark "DuPont" is owned by E. I. du Pont de Nemours and Company, Wilmington, Del.

It has been discovered that the same Kapton material works nicely for fuser belts. These fuser belts are ultrasonically welded, then super-finished to disguise the welded seam area. The foregoing super-finishing may be accomplished by any convenient super-finishing process. See, for example, the super-finishing processes described in the aforementioned U.S. Pat. No. 6,848,978 B2 to Mastro.

One problem in fabricating the fuser belts with the Kapton material, however, is that fuser belts are very small in circumference. The current fuser belts used in one application are only 30 milli-Meter ("mm") in diameter or 3.70 inches in circumference. In contrast, our current belt fabrication process is only capable of making belts as small as 18.00 inches in circumference.

Due to the beam strength of the Kapton material, its bend radius is such that the material will not lay flat when wrapped around a 30 mm diameter mandrel with a 0.25 inch-wide weld flat ground for ultrasonically joining the overlapped material. As depicted in the present FIG. 1, one problem is that the material tends to tent up, as depicted by reference number 2 in the present FIG. 1, and there is no way to get vacuum apertures 6 in close enough to the overlap area to hold the material down. This tenting is due to the beam strength of the material 20 to be welded relative to the radius of curvature of the belt.

Thus, there is a need for the present invention.

BRIEF SUMMARY OF THE INVENTION

In a first aspect of the invention, there is described a concurrent welding and severing belt forming method, the method comprising providing a material supply comprising a length of belt material, the material having a width, a first side and a second side; providing a mandrel; securing and wrapping part of the belt material supply on the mandrel to form a first material portion in direct contact with the mandrel and a second material portion overlapping part of the first material portion in a material overlap region at which the first side of the first material portion is in contact with the second side of the second material portion, the second material portion being connected to a remaining material portion of the material supply; applying a tension to the belt material supply to form a material supply tensioned portion; and welding the material overlap region to form a single seam traversing the width, the tension causing the remaining material portion of the belt material supply to concurrently sever from the seam as the seam is formed.

In a second aspect of the invention, there is described a method of forming a belt, comprising wrapping a belt material supply having a first side and a second side around the outer periphery of a mandrel in direct contact with the mandrel to form a first material portion, the belt material continued to be wrapped around the mandrel to form a belt material overlap region at which the first side of a part of the first material portion is in contact with the second side of a second material portion, the second material portion being connected to a remaining portion of the belt material supply, the belt material supply being held under a tension thus forming a belt material supply tensioned portion, an ultrasonic welding horn traversing across the width of the belt material overlap region to weld the belt material therein thus forming a single welded seam, the remaining material portion of the belt material supply being held under the tension while the welded seam is formed so that the ultrasonic welding horn concurrently severs the remaining portion of the belt material supply from the welded belt seam.

In a third aspect of the invention, there is described a concurrent welding and severing belt forming method, the method comprising providing a material supply comprising a length of belt material, the belt material a width, a first side and a second side; providing a mandrel; securing and wrapping part of the belt material supply on the mandrel to form a first material portion in direct contact with the mandrel and a second material portion overlapping the first material portion to form a material overlap region at which the first side of the first material portion is in contact with the second side of the second material portion, the second material portion being connected to a remaining material portion of the material supply; applying a tension to the material supply to form a material supply tensioned portion; welding the material overlap region to form a single seam traversing the width, the seam as formed concurrently severing itself from the remaining material portion.

DETAILED DESCRIPTION OF THE INVENTION

Briefly, belt material is wrapped around a small diameter mandrel. Instead of cutting the belt to length, the material is then continued to be wrapped around the mandrel, forming a belt material overlap, and held under tension. An ultrasonic welding horn is then traversed across the width of the belt overlap. As this horn is traversed across the overlapped joint, the horn not only joins the belt material wrapped around the mandrel but, as the trailing edge is held under tension, the horn also separates or severs the trailing edge of the material from the welded seam.

Figure 1:
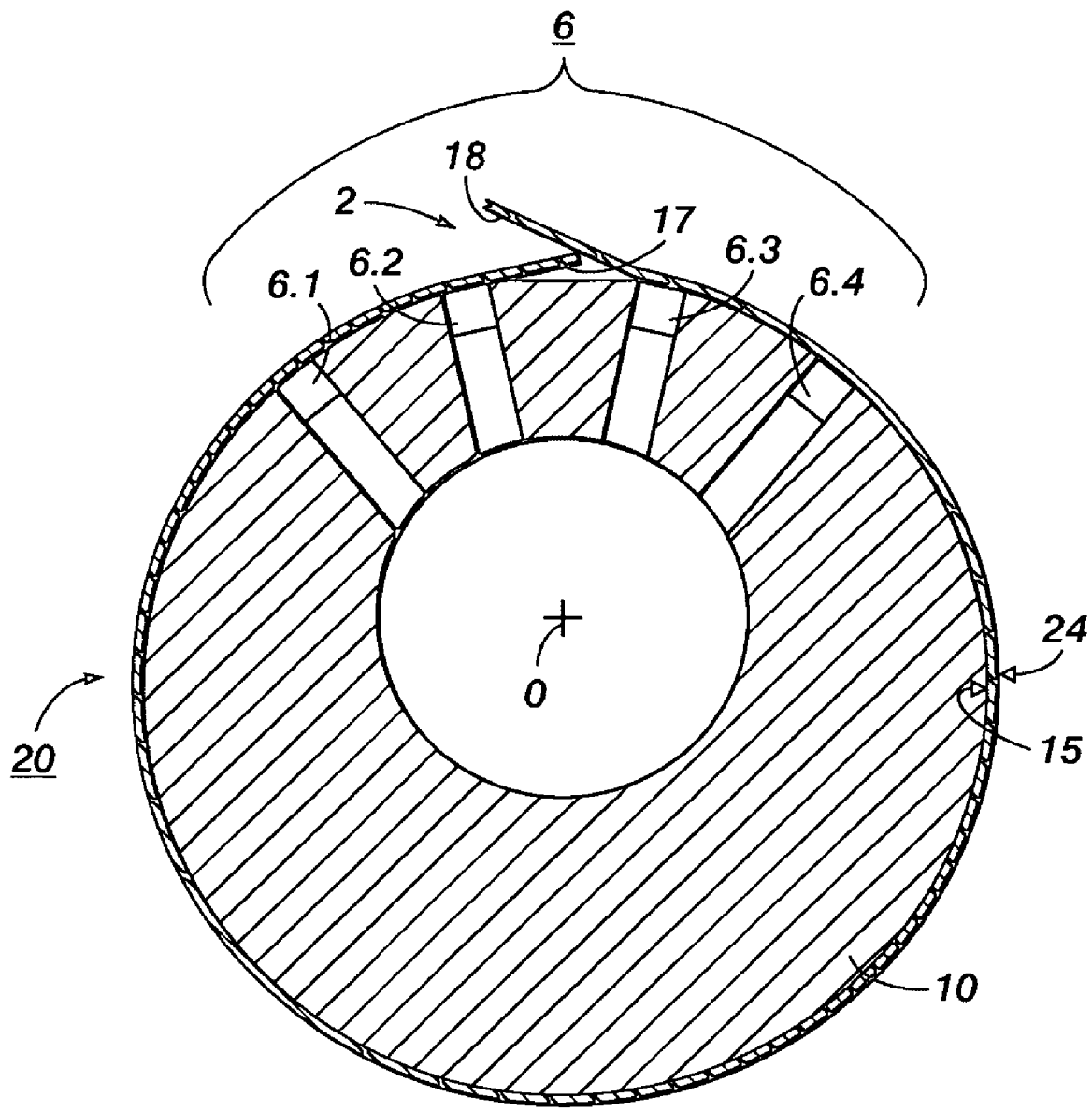
FIG. 1 is a cutaway profile attached view of a material 20 disposed on a mandrel 10. As shown, the mandrel 10 includes a mandrel axial 0 and a mandrel outer periphery 15.

Referring now to FIG. 1 there is shown a cutaway profile attached view of a material 20 disposed on a mandrel 10.

As shown, the material 20 includes a material outer surface 24, a first end 17 and a second end 18. Tenting due to the beam strength of the material 20 is depicted by reference number 2.

Still referring to FIG. 1, the mandrel 10 comprises a mandrel axial 0, an outer periphery 15, a first vacuum aperture 6.1, a second vacuum aperture 6.2, a third vacuum aperture 6.3 and a fourth vacuum aperture 6.4. The first, second, third and fourth vacuum apertures respectively designated 6.1, 6.2, 6.3 and 6.4 are collectively depicted by reference number 6.

Figure 2:
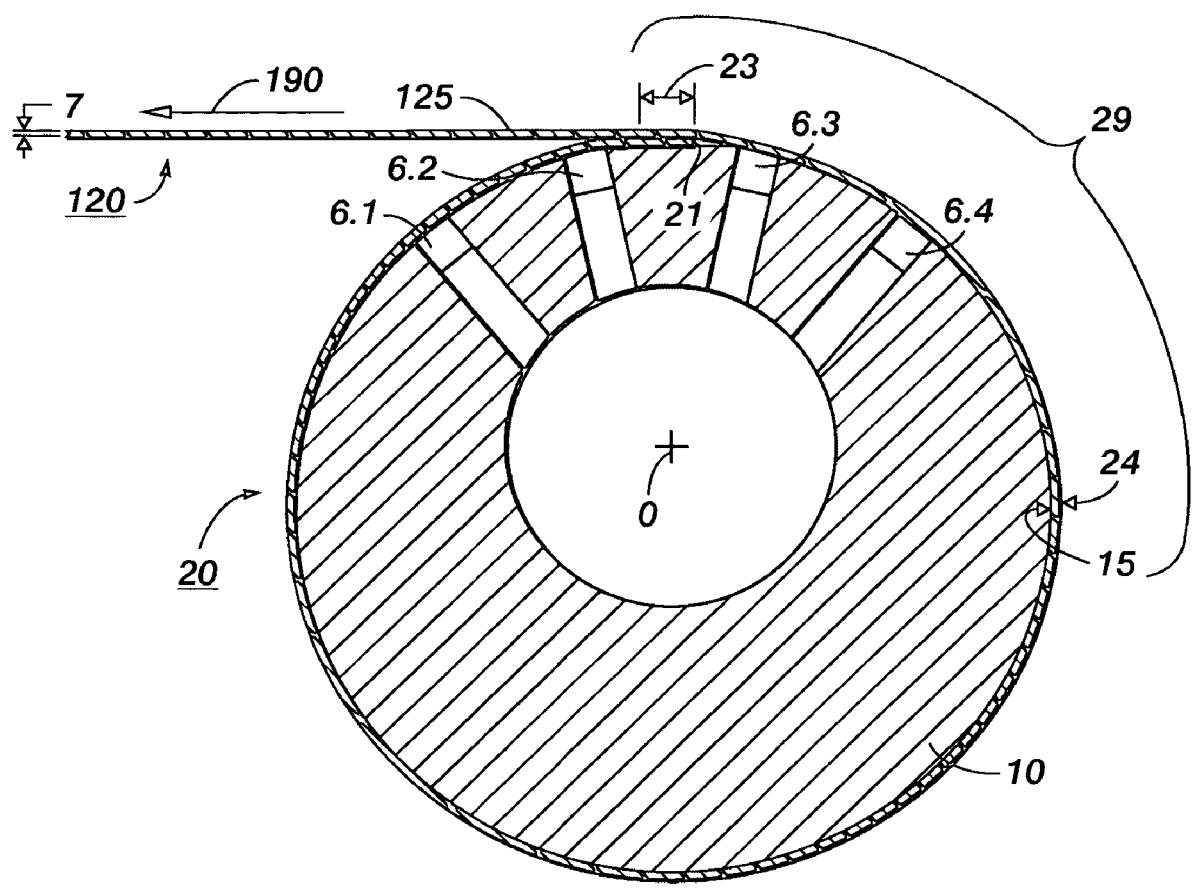
FIG. 2 is a cutaway profile attached view of a material supply 120 arranged to feed a length of material 20 to the mandrel 10 of FIG. 1.

Referring now to FIG. 2, there is shown a cutaway profile attached view of a material supply 120 arranged to feed a length of material 20 to the FIG. 1 mandrel 10.

As shown, the material 20 includes a material end 21 disposed on the mandrel outer periphery 15, with the material 20 being wrapped in a counter-clockwise direction on the mandrel outer periphery 15. The portion of the material 20 that is wrapped on the mandrel 10, or the mandrel-wrapped material portion, is depicted by reference number 29. As shown, the mandrel-wrapped material portion 29 includes a material overlap region 23. The mandrel-wrapped material portion 29 is held in place on the mandrel outer periphery 15 by means of the included mandrel vacuum apertures 6.1, 6.2, 6.3 and 6.4.

As shown, a tension force 190 is applied to the material supply 120. The resulting material tensioned or taut portion 125 thus is urged by the tension 190 to move or pull away from the material overlap 23 in the direction of the corresponding reference arrow 190.

Figure 3:
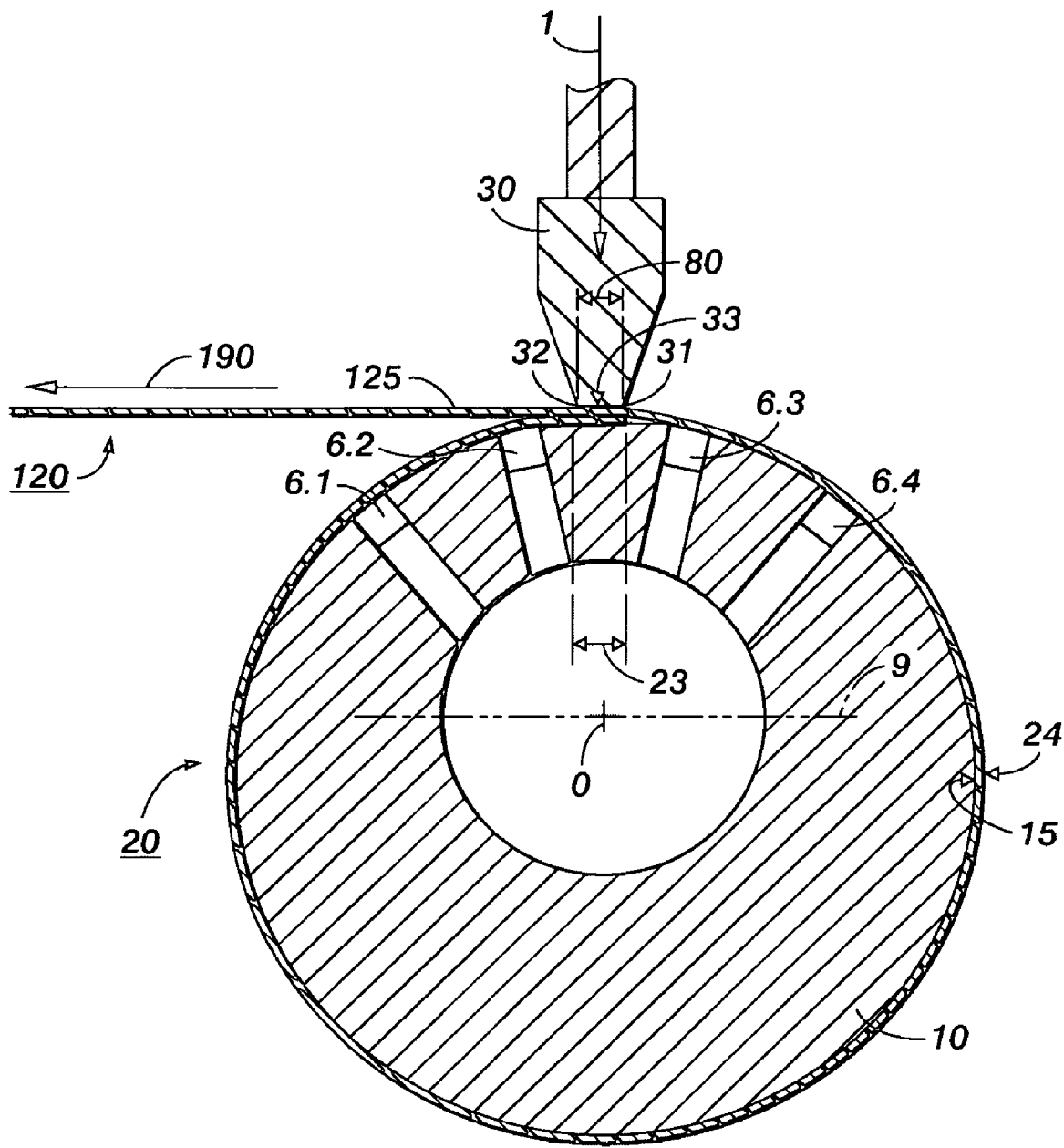
FIG. 3 is a further cutaway profile attached view of the FIG. 2 arrangement of the material 20 wrapped in a counter-clockwise direction upon the mandrel outer periphery 15, thus forming a mandrel-wrapped material portion 29. An included ultrasonic welding horn 30 is arranged to weld a seam 80 in an overlap portion 23 of the material 20 that is wrapped on the mandrel 10. Also shown is a reference arrow 1 positioned above the welding horn 30 and pointed downwards towards the seam 80 and the mandrel axial 0. A reference line 9 intersecting the mandrel axial 0 and orthogonal to the arrow 1 is included.

Referring now to FIG. 3, there is shown a further cutaway profile attached view of the FIG. 2 arrangement of the material 29 wrapped upon the mandrel outer periphery 15. Also shown is an included ultrasonic welding horn 30 having a first horn edge 31, a second horn edge 32 and a horn tip 33. As shown, the ultrasonic welding horn 30 is arranged and positioned to weld a portion of the material overlap region 23, thus forming a seam 80 in the material 20.

As shown, a reference arrow 1 is positioned above the welding horn 30 and pointed downwards towards the material seam 80 and the mandrel axial 0.

Still referring to FIG. 3, there is shown a reference line 9 intersecting the mandrel axial 0 and orthogonal to the arrow 1.

Figure 4:
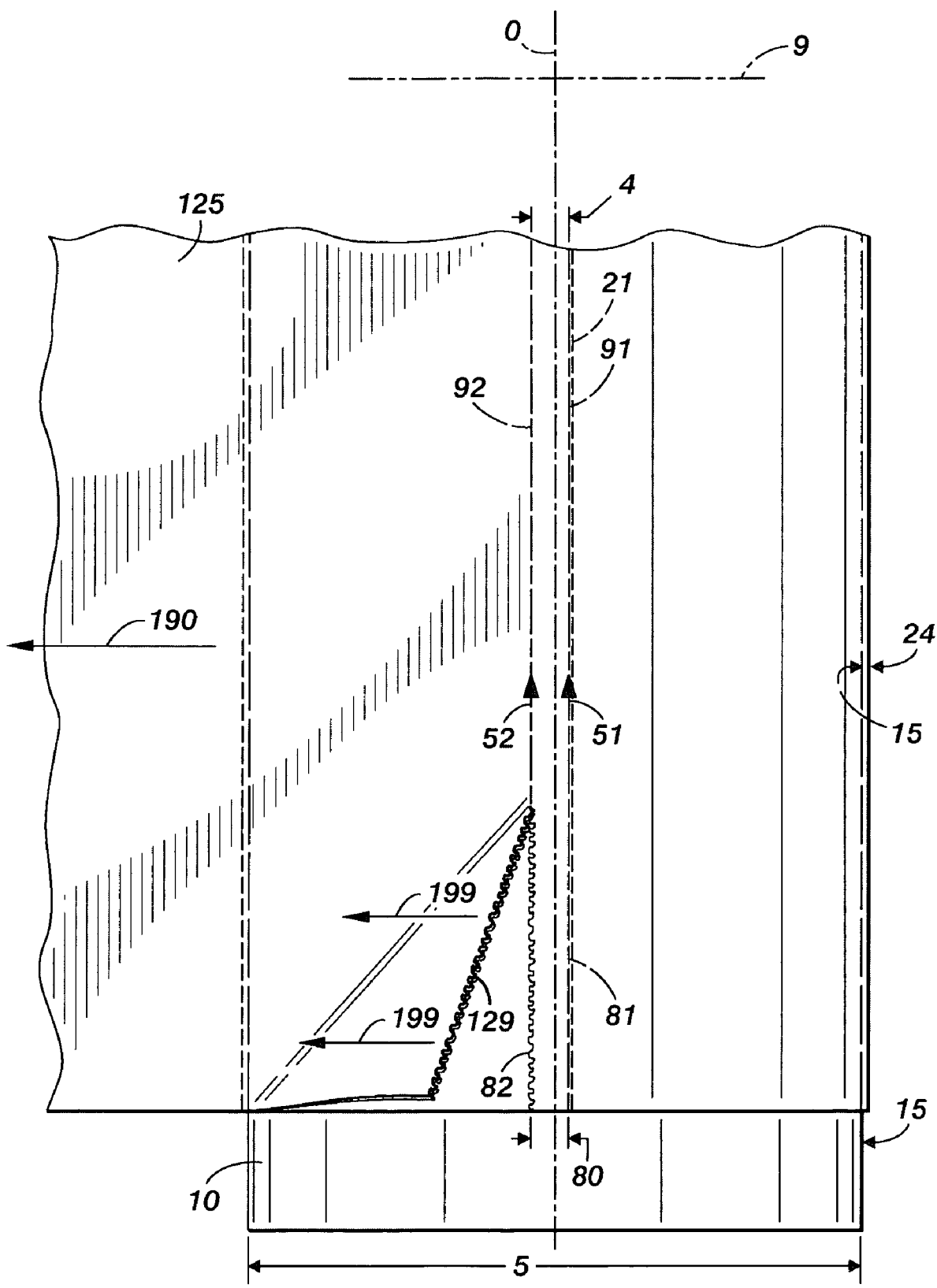
FIG. 4 is a top-down birds-eye detached view of the belt welding arrangement of FIG. 3 from the viewing position of the reference arrow 1. As shown, the reference line 9 intersects the mandrel axial 0.

Referring now to FIG. 4, there is shown a top-down birds-eye detached view of the FIG. 3 belt welding arrangement from the position of the reference arrow 1. As shown, the reference line 9 intersects the mandrel axial 0. The mandrel 10 comprises an outer diameter 5. As shown, the material seam 80 is oriented substantially parallel to the mandrel axial 0.

As shown, the belt seam 80 is bounded by a seam first periphery 91 and a substantially parallel seam second periphery 92. The two belt seam peripheries 91 and 92, in turn, are oriented generally parallel to the mandrel axial 0. The spacing between seam 80 first and second peripheries 91 and 92 is based on the spacing between the ultrasonic horn first and second edges 31 and 32.

Still referring to FIG. 4, the welding motion of the ultrasonic horn first edge 31 along the corresponding seam first periphery 91 is depicted by a first arrow 51. Similarly, the welding motion of the ultrasonic horn second edge 32 along the corresponding seam second periphery 92 is depicted by a second arrow 52.

As shown, as the ultrasonic welding horn 30 moves in a direction generally parallel along the mandrel axial 0, the belt material 20 between the welding horn edges 31 and 32 is welded together to form the belt seam 80.

Referring still to FIG. 4, the welded seam edge that is formed by the ultrasonic welding horn first edge 31 is depicted by reference number 81.

Likewise, the welded seam edge that is formed by the ultrasonic welding horn second edge 32 is depicted by reference number 82.

As shown in FIG. 4, as the material 20 along the seam second periphery 92 is welded to form the welded seam edge 82, the material supply tension force 190 concurrently causes the material supply tensioned portion 125 to become separated or severed from the welded seam edge 82. This concurrent severing of the material supply tensioned portion 125 from the welded seam edge 82 is depicted by reference number 199. The concurrently-severed edge of the material supply tensioned portion 125 is depicted by reference number 129.

As shown in FIG. 4, the resulting welded seam 80 is substantially or generally parallel to the mandrel axial 0.

To summarize, in FIG. 4 the seam 80 results from welding the first seam edge 81 while concurrently-severing-and-welding the second seam edge 82. After the foregoing process is complete, the resulting belt seam 80 is finished by means of a super-finishing process. The resulting finished belt 200 is discussed in connection with FIG. 5 below.

Figure 5:
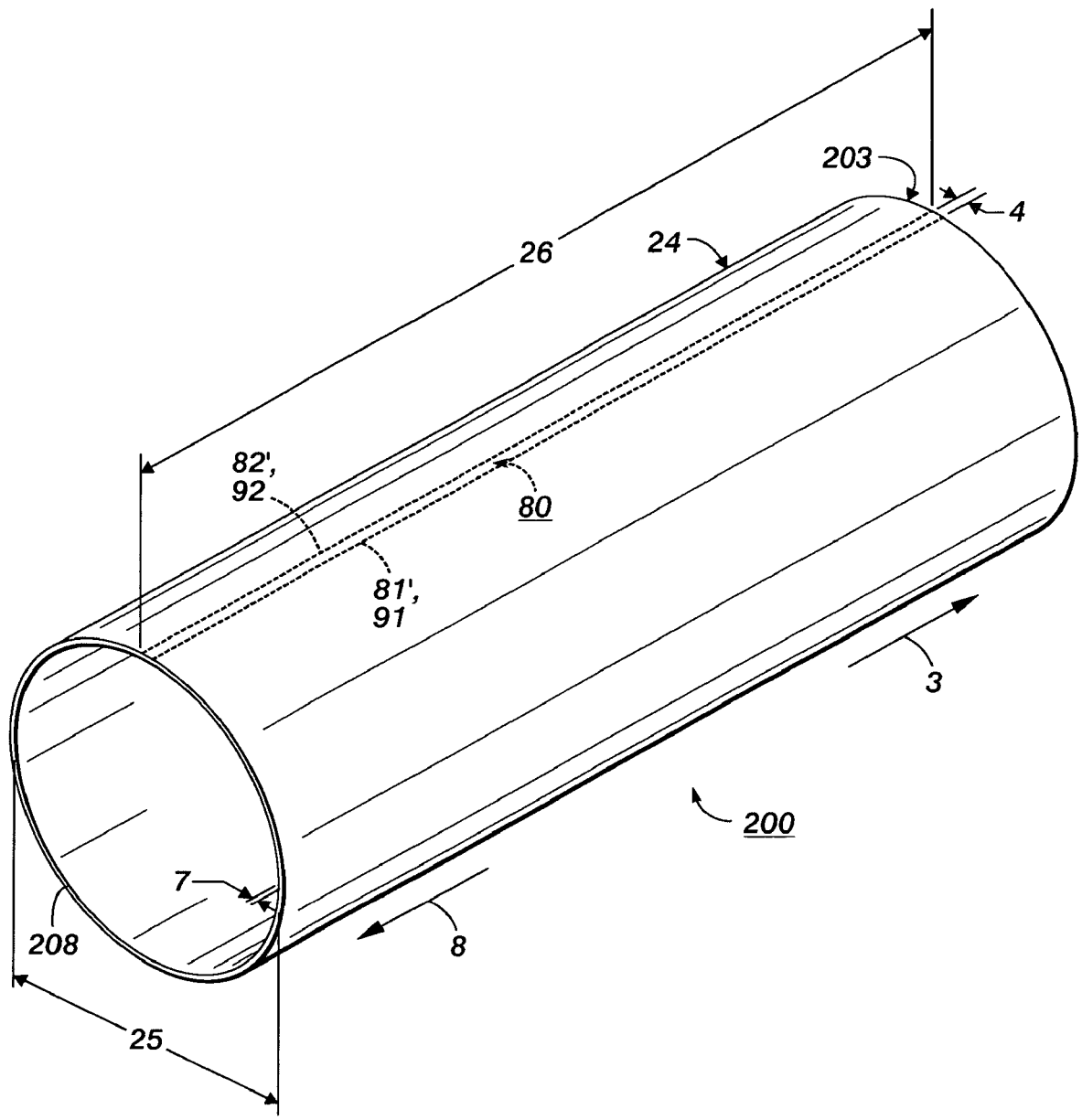
FIG. 5 is an elevated perspective detached profile view of a finished belt 200. An inboard direction is depicted by reference number 3, and the opposite outboard direction is depicted by reference number 8.

Referring now to FIG. 5, there is shown an elevated perspective detached profile view of the finished belt 200. An inboard direction is depicted by reference number 3, and the opposite outboard direction is depicted by reference number 8. As shown, the belt 200 comprises a belt inboard end 83, a belt outboard end 28, with a belt material width 26 therebetween. Further, the belt 20 comprises an inner diameter 25 that is substantially equal to the mandrel outer diameter 5. Also, the finished belt 200 comprises a belt material thickness 7 and a belt material outer surface 24.

As shown, the finished belt 200 comprises the seam 80 of FIG. 4. As discussed in connection with FIG. 4 above, the seam 80 is generally bounded by the seam first periphery 91 and the seam second periphery 92.

Still referring to FIG. 5, the depicted belt 200 finished seam edge along the first periphery 91 is depicted by reference number 81'. It will be understood that the finished seam edge 81' in the present FIG. 5 corresponds to the finished version of the welded seam edge 81 that is discussed in connection with FIG. 4 above.

Referring still to FIG. 5, the depicted belt 200 finished seam edge along the second periphery 92 is depicted by reference number 82'. It will be understood that the finished seam edge 82' in the present FIG. 5 corresponds to the finished version of the welded-and-concurrently-severed seam edge 82 that is discussed in connection with FIG. 4 above.

Moreover, in one embodiment, this invention comprises an initial step of holding the leading edge of the belt material with standard vacuum apertures coupled to an included vacuum source. Any suitable vacuum source may be used for this purpose. For good understanding, the vacuum source itself is not shown in the drawing.

The belt material is then wrapped around a small diameter mandrel. Instead of cutting the belt to length, the material is then continued to be wrapped around the mandrel, forming a very large overlap, and held under tension. This forms a relatively large overlap of material, but holds the material down conforming to the mandrel's geometry.

An ultrasonic welding horn is then traversed across the width of the belt overlap. In one embodiment, a "Branson" 2000 LP, 40 KHz, 300 Watt ultrasonic welding system is used. This product is supplied by Branson Ultrasonics Corporation, 41 Eagle Road, Danbury, Conn. 06813, phone 203-796-0400. This ultrasonic horn profile has only a 1.2 mm diameter horn tip, which welds just a 1.2 mm wide area under the very wide overlapped joint. As this horn is traversed across the overlapped joint, the horn not only joins the belt material wrapped around the mandrel but, as the trailing edge is held under tension, the horn also separates or severs the trailing edge of the material from the welded seam.

Thus, as a result of the aforementioned process, there is now provided a joined small diameter fuser belt. Because the ultrasonically separated or severed trailing edge of the material is ragged and rough, it must be cut off, thus exposing a clean flat edge ready for the next wrapping cycle.

The newly-formed belt, still wrapped around its mandrel, is then "super-finished" to smooth and flatten the seamed area. After finishing, the vacuum source is turned off, and the finished belt is removed from the mandrel. In one embodiment, compressed air is pumped through the vacuum apertures to assist with the belt removal process.

In summary, there is provided a method of fabrication for small diameter belts. This method comprises holding the belt material in tension with a large overlap and then ultrasonically welding and slitting in a single step. This operation is followed by a super-finishing operation to smooth the weld line.

In one embodiment, the material 20 comprises any thermoplastic thin film.

Thus, there is described the first aspect of the invention, namely, a concurrent welding and severing belt forming method, the method comprising providing a material supply 120 comprising a length of material 20, the material having a width 26; providing a mandrel 10; securing and wrapping the material 20 on the mandrel 10 to form a material overlap region 23; applying a tension 190 to the material supply 120 to form a material supply tensioned portion 125; and welding 30, 31, 32, 33 the material overlap region 23 to form a seam 80 traversing the width 26, the tension 190 causing the material supply tensioned portion 125 to concurrently sever 199 from the seam 80 as the seam 80 is formed.

The following nine (9) sentences labeled A through I apply to the foregoing first aspect of the invention:

A. In one embodiment, the material 20 is secured on the mandrel 10 by means of one or more included vacuum apertures 6.

B. In one embodiment, the seam 80 is welded by means of an ultrasonic welding horn 30.

C. In one embodiment, the mandrel 10 comprises an outer periphery 15 that is substantially circular-shaped.

D. In one embodiment, the mandrel 10 comprises a mandrel axial 0 and the seam 80 is formed in a direction 51, 52 that is substantially parallel to the mandrel axial 0.

E. In one embodiment, the mandrel 10 comprises an outer diameter 5 of about 30 milli-meters ("mm").

F. In one embodiment, the ultrasonic welding horn 30 comprises a welding horn tip 33 with a diameter of about 1.2 mm.

G. In one embodiment, the material 20 comprises a thermoplastic film.

H. In one embodiment, the method includes a step of super-finishing the seam 80 to form a finished belt 200.

I. In one embodiment, the finished belt 200 comprises a fuser belt.

Also, there is described the second aspect of the invention, namely, a method of forming a belt 200, comprising wrapping a belt material 20 supply 120 around the outer periphery 15 of a mandrel 10, the belt material 20 continued to be wrapped around the mandrel to form a belt material overlap region 23, the belt material supply 120 being held under a tension 190 thus forming a belt material supply tensioned portion 125, an ultrasonic welding horn 30 traversing 51, 52 across the width 26 of the belt material overlap region 23 to weld the belt material 20 therein thus forming a welded seam 80, the trailing edge 129 of the belt material supply ensioned portion 125 being held under the tension 190 while the welded seam 80 is formed so that the ultrasonic welding horn 30 concurrently severs the belt material supply tensioned portion 125 trailing edge 129 from the welded seam 80.

The following eight (8) sentences labeled J through Q apply to the foregoing second aspect of the invention:

J. In one embodiment, the belt material 20 is secured on the mandrel 10 by means of one or more included vacuum apertures 6.

K. In one embodiment, the mandrel 10 comprises an outer periphery 15 that is generally circular-shaped.

L. In one embodiment, the mandrel 10 comprises a mandrel axial 0 and the seam 80 is formed in a direction 51, 52 that is generally parallel to the mandrel axial 0.

M. In one embodiment, the mandrel 10 comprises an outer diameter of about 30 milli-meters ("mm").

N. In one embodiment, the ultrasonic welding horn 30 comprises a welding horn tip 33 with a diameter of about 1.2 mm.

O. In one embodiment, the belt material 20 comprises a thermoplastic film.

P. In one embodiment, the method includes a step of super-finishing the seam 80.

Q. In one embodiment, the belt 200 comprises a fuser belt.

Also, there is described the third aspect of the invention, namely, a concurrent welding and severing belt forming method, the method comprising providing a material supply 120 comprising a length of material 20, the material having a width 26; providing a mandrel 10; securing and wrapping the material 20 on the mandrel 10 to form a material overlap region 23; applying a tension 190 to the material supply 120 to form a material supply tensioned portion 125; welding 30, 31, 32, 33 the material overlap region 23 to form a seam 80 traversing the width 26, the seam 80 as formed concurrently severing itself 199 from the material supply tensioned portion.

The following nine (9) sentences labeled R through Z apply to the foregoing third aspect of the invention:

R. In one embodiment, the material 20 is secured on the mandrel 10 by means of one or more included vacuum apertures 6.

S. In one embodiment, the seam 80 is welded by means of an ultrasonic welding horn 30.

T. In one embodiment, the mandrel 10 comprises an outer periphery 15 that is substantially circular-shaped.

U. In one embodiment, the mandrel 10 comprises a mandrel axial 0 and the seam 80 is formed in a direction 51, 52 that is substantially parallel to the mandrel axial 0.

V. In one embodiment, the mandrel 10 comprises an outer diameter 5 of about 30 milli-meters ("mm").

W. In one embodiment, the ultrasonic welding horn 30 comprises a welding horn tip 33 with a diameter of about 1.2 mm.

X. In one embodiment, the material 20 comprises a thermoplastic film.

Y. In one embodiment, the method includes a step of super-finishing the seam 80 to form a finished belt 200.

Z. In one embodiment, the finished belt 200 comprises a fuser belt.

The table below lists the drawing element reference numbers together with their corresponding written description:

Ref. No.: Description:
0 mandrel axial
1 reference arrow pointing towards the seam 80 and the mandrel axial 0
2 tenting
3 inboard direction
4 seam width
5 mandrel outer diameter
6 vacuum apertures
6.1 first vacuum aperture
6.2 second vacuum aperture
6.3 third vacuum aperture
6.4 fourth vacuum aperture
7 material thickness
8 outboard direction
9 reference line intersecting mandrel axial 0 and orthogonal to the reference arrow 1
10 mandrel
15 mandrel outer periphery
17 material first end
18 material second end
20 material
21 material end
23 material overlap region
24 material outer surface
25 finished belt inner diameter
26 material width, also finished belt width
29 material portion wrapped on mandrel, or mandrel-wrapped material portion
30 ultrasonic welding horn
31 ultrasonic welding horn first edge
32 ultrasonic welding horn second edge
33 ultrasonic welding horn tip
51 ultrasonic welding horn first edge seam welding motion direction
52 ultrasonic welding horn second edge seam welding motion direction
80 welded material, or welded seam
81 welded seam edge
81' finished version of the welded seam edge 81
82 concurrently-severed-and-welded seam edge
82' finished version of the concurrently-severed-and-welded seam edge 82
91 seam first periphery
92 seam second periphery
120 material supply
125 material supply tensioned portion
129 material supply concurrently-severed edge, also material supply trailing edge
190 tension force
199 concurrent severing of the material supply tensioned portion 125 from the welded seam edge 82
200 finished belt
203 finished belt inboard end
208 finished belt outboard end While various embodiments of a concurrent welding and severing belt forming process, in accordance with the present invention, are described above, the scope of the invention is defined by the following claims.

What is claimed is:

1. A concurrent welding and severing belt forming method, the method comprising providing a material supply comprising a length of belt material, the belt material having a width, a first side and a second side; providing a mandrel; securing and wrapping part of the belt material supply on the mandrel to form a first material portion in direct contact with the mandrel and a second material portion overlapping part of the first material portion in a material overlap region at which the first side of first material portion is in contact with the second side of the second material portion, the second material portion being connected to a remaining material portion of the material supply; applying a tension to the material supply to form a material supply tensioned portion; and welding the material overlap region to form a belt having a single seam traversing the width, the tension causing the remaining material portion of the belt material supply to concurrently sever from the seam as the seam is formed.

2. The method of claim 1, the belt material being secured on the mandrel by means of one or more included vacuum apertures.

3. The method of claim 1, the seam being welded by means of an ultrasonic welding horn.

4. The method of claim 3, the mandrel comprising an outer periphery that is substantially circular-shaped.

5. The method of claim 4, wherein the mandrel comprises a mandrel axial and the belt seam is formed in a direction that is substantially parallel to the mandrel axial.

6. The method of claim 4, the mandrel comprising an outer diameter of about 30 milli-meters ("mm").

7. The method of claim 3, the ultrasonic welding horn comprising a welding horn tip with a diameter of about 1.2 mm.

8. The method of claim 1, the material comprising a thermoplastic film.

9. The method of claim 1, including smoothing and flattening the seam to form a finished belt.

10. The method of claim 9, the finished belt comprising a fuser belt.

11. A method of forming a belt, comprising wrapping a belt material supply having a first side and a second side around the outer periphery of a mandrel in direct contact with the mandrel to form a first material portion, the belt material continued to be wrapped around the mandrel to form a belt material overlap region at which the first side of a part of the first material portion is in contact with the second side of a second material portion, the second material portion being connected to a remaining material portion of the belt material supply, the belt material supply being held under a tension thus forming a belt material supply tensioned portion, an ultrasonic welding horn traversing across the width of the belt material overlap region to weld the belt material therein thus forming a single welded belt seam, the remaining material portion of the belt material supply being held under the tension while the welded belt seam is formed so that the ultrasonic welding horn concurrently severs the remaining material portion of the belt material supply from the welded belt seam.

12. The method of claim 11, the belt material being secured on the mandrel by means of one or more included vacuum apertures.

13. The method of claim 12, the mandrel comprising an outer periphery that is generally circular-shaped.

14. The method of claim 13, wherein the mandrel comprises a mandrel axial and the seam is formed in a direction that is generally parallel to the mandrel axial.

15. The method of claim 14, the mandrel comprising an outer diameter of about 30 milli-meters ("mm").

16. The method of claim 15, the ultrasonic welding horn comprising a welding horn tip with a diameter of about 1.2 mm.

17. The method of claim 16, the belt material comprising a thermoplastic film.

18. The method of claim 17, including smoothing and flattening the seam.

19. The method of claim 18, the belt comprising a fuser belt.

20. A concurrent welding and severing belt forming method, the method comprising providing a material supply comprising a length of belt material, the belt material having a width, a first side and a second side; providing a mandrel; securing and wrapping part of the belt material supply on the mandrel to form a first material portion in direct contact with the mandrel and a second material portion overlapping part of the first material portion in a material overlap region at which the first side of the first material portion is in contact with the second side of the second material portion, the second material portion being connected to a remaining material portion of the material supply; applying a tension to the material supply to form a material supply tensioned portion; welding the material overlap region to form a single seam traversing the width, the seam as formed concurrently severing itself from the remaining material portion.

21. The method of claim 20, the belt material being secured on the mandrel by means of one or more included vacuum apertures.

22. The method of claim 20, the seam being welded by means of an ultrasonic welding horn.

23. The method of claim 22, the mandrel comprising an outer periphery that is substantially circular-shaped.

24. The method of claim 23, wherein the mandrel comprises a mandrel axial and the seam is formed in a direction that is substantially parallel to the mandrel axial.

25. The method of claim 23, the mandrel comprising an outer diameter of about 30 milli-meters ("mm").

26. The method of claim 22, the ultrasonic welding horn comprising a welding horn tip with a diameter of about 1.2 mm.

27. The method of claim 20, the belt material comprising a thermoplastic film.

28. The method of claim 20 including smoothing and flattening the seam.

29. The method of claim 28, the finished belt comprising a fuser belt.

* * * * *